(12) United States Patent
Zhamu et al.

(10) Patent No.: US 12,246,967 B2
(45) Date of Patent: Mar. 11, 2025

(54) PROCESS FOR PRODUCING INTEGRAL GRAPHENE FILMS FROM FUNCTIONALIZED GRAPHENE SHEETS

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 15/980,015

(22) Filed: May 15, 2018

(65) Prior Publication Data

US 2019/0352186 A1     Nov. 21, 2019

(51) Int. Cl.
*H01M 4/00* (2006.01)
*C01B 32/194* (2017.01)
(Continued)

(52) U.S. Cl.
CPC .............. *C01B 32/194* (2017.08); *C09K 5/14* (2013.01); *H01B 1/24* (2013.01); *H01B 5/00* (2013.01);
(Continued)

(58) Field of Classification Search
CPC . H01M 4/00; B05D 1/00; C01B 32/00; C23C 16/00
See application file for complete search history.

(56) References Cited

U.S. PATENT DOCUMENTS 7,071,258 B1    7/2006  Jang et al.
2003/0089893 A1  5/2003  Niu et al.
(Continued)

FOREIGN PATENT DOCUMENTS

KR     101489174 B1 *  2/2015
WO     2006130150 A9   6/2009

OTHER PUBLICATIONS

KR-101489174-B1, Google Patent translation (Year: 2015).*
(Continued)

*Primary Examiner* — Kelly M Gambetta
*Assistant Examiner* — Mohammad Mayy

(57) ABSTRACT

Provided is a process for producing an integral graphene film, comprising: (a) preparing a graphene dispersion having chemically functionalized graphene sheets dispersed in a fluid medium wherein the graphene sheets contain chemical functional groups attached thereto; (b) dispensing and depositing a wet film of the graphene dispersion onto a supporting substrate, wherein the dispensing and depositing procedure includes mechanical shear stress-induced alignment of the graphene sheets along a film planar direction, and partially or completely removing the fluid medium to form a relatively dried film comprising aligned chemically functionally graphene sheets; and (c) using heat, electromagnetic waves, UV light, or high-energy radiation to induce chemical reactions or chemical bonding between chemical functional groups attached to adjacent chemically functionalized graphene sheets to form the integral graphene film. The film after step (b) or (c) may be further compressed to increase the degree of graphene sheet orientation in the integral graphene film.

15 Claims, 10 Drawing Sheets

(51) Int. Cl.
*C09K 5/14* (2006.01)
*H01B 1/24* (2006.01)
*H01B 5/00* (2006.01)
*B82Y 30/00* (2011.01)
*B82Y 40/00* (2011.01)

(52) U.S. Cl.
CPC ............... *B82Y 30/00* (2013.01); *B82Y 40/00* (2013.01); *C01B 2204/04* (2013.01); *C01B 2204/22* (2013.01); *C01B 2204/24* (2013.01); *C01B 2204/32* (2013.01); *Y10S 977/734* (2013.01); *Y10S 977/847* (2013.01)

(56) References Cited

U.S. PATENT DOCUMENTS

| | | |
|---|---|---|
| 2005/0271574 A1 | 12/2005 | Jang et al. |
| 2008/0048152 A1 | 2/2008 | Jang et al. |
| 2010/0055025 A1 | 3/2010 | Jang et al. |
| 2011/0017587 A1 | 1/2011 | Zhamu et al. |
| 2011/0017955 A1 | 1/2011 | Zhamu et al. |
| 2011/0062422 A1 | 3/2011 | Ryu et al. |
| 2011/0127638 A1* | 6/2011 | Brenner ............... H01L 29/1606 257/607 |
| 2014/0147648 A1 | 5/2014 | Zhamu et al. |
| 2015/0218003 A1* | 8/2015 | Zhamu .................. C01B 32/192 428/220 |
| 2015/0239741 A1* | 8/2015 | Burton ................. C08G 65/321 525/327.3 |
| 2015/0284253 A1 | 10/2015 | Zhamu et al. |
| 2016/0079001 A1* | 3/2016 | Lin ....................... H01G 4/1245 361/305 |
| 2016/0304351 A1* | 10/2016 | Zhamu ..................... C09K 5/14 |
| 2017/0021387 A1* | 1/2017 | Lin ........................... B05D 1/28 |
| 2017/0081193 A1* | 3/2017 | Zhamu .................. C01B 32/194 |

OTHER PUBLICATIONS

Cong et al., "Wet-spinning assembly of continuous, neat, and macroscopic graphene fibers" Scientific Report (2012) vol. 2, pp. 613-618.

Dong et al., "Facile fabrication of light, flexible and multifunctional graphene fibers" Ad. Mater. (2012) vol. 24, pp. 1856-1861.

Georgakilas et al., "Functionalization of Graphene: Covalent and Non-Covalent Approaches, Derivatives and Applications" Chem. Rev. (2012) vol. 112, No. 11, pp. 6156-6214; DOI: 10.1021/cr3000412.

Karlicky et al., "Halogenated Graphenes: Rapidly Growing Family of Graphene Derivatives" ACS Nano (2013) vol. 7, No. 8, pp. 6434-6464.

Wan et al., "Sequentially bridged graphene sheets with high strength, toughness, and electrical conductivity" PNAS Latest Articles, 6 pages. www.pnas.org/cgi/doi/10.1073/pnas.1719111115.

Xu et al., "Graphene chiral liquid crystals and macroscopic assembled fibers" Nature Communications (2011) vol. 2, p. 571-580.

\* cited by examiner

20 μm (50 μm wide)

(Scheme 1)

(Scheme 2)

PROCESS FOR PRODUCING INTEGRAL GRAPHENE FILMS FROM FUNCTIONALIZED GRAPHENE SHEETS

FIELD OF THE INVENTION

The present invention relates generally to the field of graphene films and, more particularly, to a new class of graphene films produced from functionalized graphene sheets. This new class of films exhibits a combination of exceptionally high tensile strength, elastic modulus, thermal conductivity, and electrical conductivity along all in-plane directions.

BACKGROUND OF THE INVENTION

Carbon is known to have five unique crystalline structures, including diamond, fullerene (0-D nano graphitic material), carbon nanotube or carbon nanofiber (1-D nano graphitic material), graphene (2-D nano graphitic material), and graphite (3-D graphitic material, including graphite fiber). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material. Although multiple CNTs or CNFs can be spun into fiber yarns, these yarns are not considered as "continuous fibers". They are twisted aggregates of individual CNTs or CNFs (each being but a few microns long) that are not self-bonded together; instead, they are mechanically fastened together as a yarn.

Bulk natural graphite is a 3-D graphitic material with each particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another.

A graphite single crystal (crystallite) per se is anisotropic with a property measured along a direction in the basal plane (crystallographic a- or b-axis direction) being dramatically different than if measured along the crystallographic c-axis direction (thickness direction). For instance, the thermal conductivity of a graphite single crystal can be up to approximately 1,920 W/mK (theoretical) or 1,800 W/mK (experimental) in the basal plane (crystallographic a- and b-axis directions), but that along the crystallographic c-axis direction is less than 10 W/mK (typically less than 5 W/mK). Further, the multiple grains or crystallites in a graphite particle are typically all oriented along different directions. Consequently, a natural graphite particle composed of multiple grains of different orientations exhibits an average property less than 200 W/mK.

The constituent graphene planes of a graphite crystallite can be exfoliated and extracted or isolated from a graphite crystallite to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an inter-graphene plane spacing of 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets or NGPs are a new class of carbon nanomaterial (a 2-D nano carbon) that is distinct from the 0-D fullerene, the 1-D CNT, and the 3-D graphite.

Our research group pioneered the development of graphene materials as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Patent Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Patent Pub. No. 2008-0048152).

It would be highly desirable in many applications to produce a bulk graphite-derived graphene object (e.g. in a thin film form) having sufficiently large dimensions (length and width) and having all graphene planes being essentially parallel to one another along one desired direction; e.g. along a graphene film planar direction (any direction of a primary surface of a thin film).

Thus, it is an object of the present invention to provide a process for producing high-strength and high-modulus graphene films (not graphene paper) by using particles of natural graphite or artificial graphite as the starting material.

A specific object of the present invention is to provide a graphene-derived thin film (not graphene paper) that is composed of functionalized graphene sheets that are chemically bonded or interconnected together, not just an aggregate of discrete graphene sheets.

SUMMARY OF THE INVENTION

The present invention provides an integral graphene film comprising chemically functionalized graphene sheets that are chemically bonded or interconnected with one another having an inter-planar spacing $d_{002}$ from 0.36 nm to 1.5 nm as determined by X-ray diffraction and a non-carbon element content of 0.1% to 47% by weight, wherein said functionalized graphene sheets are substantially parallel to one another and parallel to an in-plane direction of said integral graphene film and said integral graphene film has a length from 1 cm to 10,000 m, a width from 1 cm to 5 m (preferably from 2 cm to 1 m, more preferably 4 cm to 50 cm), a thickness from 2 nm to 500 m (preferably from 10 nm to 200 m and more preferably from 1 μm to 50 μm), and a physical density from 1.5 to 2.25 g/cm$^3$ (more typically >1.9 g/cm$^3$ and more typically and desirably 2.1 g/cm$^3$). The graphene sheets are typically interconnected with one another via chemical bonding or reactions between the chemically active functional groups attached to respective adjacent graphene sheets. These chemically active functional groups are capable of reacting with neighboring groups by forming covalent bonds, hydrogen bonds, and/or π-π bonds. The integral graphene film has a degree of graphene plane orientation greater than 87%, typically from 87% to approximately 99%.

The present invention also provides a process for producing an integral graphene film from chemically functionalized graphene sheets. In certain embodiments, the process comprises:
  (a) preparing a graphene dispersion having chemically functionalized graphene sheets dispersed in a liquid medium (e.g. water or an organic solvent), wherein the chemically functionalized graphene sheets contain chemical functional groups attached thereto (on graphene sheet surfaces and/or edges) and a non-carbon element content of 0.1% to 47% by weight;
  (b) dispensing and depositing a wet film of said graphene dispersion onto a supporting substrate, wherein the dispensing and depositing procedure includes mechanical shear stress-induced alignment of chemically functionalized graphene sheets along a film planar direction, and partially or completely removing the liquid medium from the wet film to form a dried graphene film comprising aligned chemically functionalized graphene sheets; and
  (c) using heat, electromagnetic waves (e.g. radio frequency waves, or microwaves), UV light, high-energy radiation (e.g. electron beam, Gamma ray, or X-ray), or a combination thereof to induce chemical reactions or chemical bonding between chemical functional groups attached to adjacent chemically functionalized graphene sheets in the dried graphene film to form the integral graphene film, wherein the integral graphene film comprises chemically functionalized graphene sheets that are chemically bonded or interconnected with one another having an inter-planar spacing $d_{002}$ from 0.36 nm to 1.5 nm as determined by X-ray diffraction and a non-carbon element content of 0.1% to 47% by weight, wherein the functionalized graphene sheets are substantially parallel to one another and parallel to a planar direction of said integral graphene film and the integral graphene film has a length from 1 cm to 10,000 m, a width from 1 cm to 5 m, a thickness from 10 nm to 500 μm, and a physical density from 1.5 to 2.2 $g/cm^3$.

The process may further comprise a step of compressing the graphene film (after step (b) or (c)) to increase the degree of graphene sheet orientation and physical density, and to improve contact between chemically functionalized graphene sheets. This would also facilitate chemical interconnection between graphene sheets.

The invention also provides a process for producing an integral graphene film from graphene sheets. In certain embodiments, the process comprises:
  (a) preparing a graphene dispersion having graphene sheets dispersed in a fluid medium (e.g., water or an organic solvent);
  (b) dispensing and depositing a wet film of graphene dispersion onto a supporting substrate, wherein the dispensing and depositing procedure includes mechanical shear stress-induced alignment of graphene sheets along a film planar direction, and partially or completely removing the liquid medium from the wet film to form a dried graphene film comprising aligned graphene sheets;
  (c) bringing the dried graphene film in contact with a chemical functionalizing agent so as to produce a graphene film of chemically functionalized graphene sheets having chemical functional groups attached thereto and a non-carbon element content (e.g. H, O, N, B, P, Cl, F, Br, I, S, etc.) of 0.1% to 47% by weight; and
  (d) using heat, electromagnetic waves (e.g. radio frequency waves, or microwaves), UV light, high-energy radiation (e.g. electron beam, Gamma ray, or X-ray), or a combination thereof to induce chemical reactions or chemical bonding between chemical functional groups attached to adjacent chemically functionalized graphene sheets to form the integral graphene film, wherein the integral graphene film comprises chemically functionalized graphene sheets that are chemically bonded or interconnected with one another having an inter-planar spacing $d_{002}$ from 0.36 nm to 1.5 nm as determined by X-ray diffraction and a non-carbon element content of 0.1% to 47% by weight, wherein the functionalized graphene sheets are substantially parallel to one another and parallel to a planar direction of the integral graphene film and the integral graphene film has a length from 1 cm to 10,000 m, a width from 1 cm to 5 m, a thickness from 10 nm to 500 μm, and a physical density from 1.5 to 2.2 $g/cm^3$.

In step (a), the graphene sheets have not been chemically functionalized yet. Step (c) is conducted to chemically functionalize the graphene sheets in a thin film structure. This thin film is not a sheet of graphene paper. The process may further comprise a step of compressing the graphene film (after step (c) or (d)) to increase the degree of graphene sheet orientation and physical density, and to improve contact between chemically functionalized graphene sheets.

In all versions of the process, step (b) of dispensing and depositing can include casting, coating (e.g. comma coating, slot-die coating, reverse-roll coating, etc.), high-rate or high-intensity spraying or spray coating (e.g. ultrasonic spraying, pressurized air-activated spraying, etc.), extrusion plus high-rate wiping, etc. The primary purposes of these operations are to well-align the graphene sheets and closely packed the well-oriented graphene sheets together.

In certain preferred embodiments, in a reverse-roll coating-based process, step (b) of dispensing and depositing includes depositing the graphene dispersion onto a surface of an application roller rotating in a first direction at a first line velocity to form an applicator layer of graphene sheets (or chemically functionalized graphene sheets), wherein the application roller transfers said applicator layer of graphene sheets (or chemically functionalized graphene sheets) to a surface of a supporting film driven in a second direction opposite to the first direction at a second line velocity, to form a wet layer of graphene sheets (or chemically functionalized graphene sheets) on the supporting film.

In this process, preferably, the supporting film is driven by a counter-rotating supporting roller disposed at a working distance from the application roller and rotating in the second direction opposite to the first direction. The process may include operating 2, 3, or 4 rollers. The process may include a reverse roll transfer coating procedure. In certain preferred embodiments, in the process, the velocity ratio, defined as (the second line velocity)/(the first line velocity), is from 1/5 to 5/1.

In certain embodiments, the step of dispensing the graphene dispersion onto the surface of the application roller includes using a metering roller and/or a doctor's blade to provide a desired thickness of the applicator layer of graphene dispersion the application roller surface.

In certain embodiments, the supporting film is fed from a feeder roller and the dried layer of graphene supported by the supporting film is wound on a winding roller and the process is conducted in a roll-to-roll manner.

In certain embodiments, the chemically functionalized graphene sheets in the long fiber contain a chemical functional group selected from the group consisting of alkyl or aryl silane, alkyl or aralkyl group, hydroxyl group, carboxyl group, carboxylic group, amine group, sulfonate group (—$SO_3H$), aldehydic group, quinoidal, fluorocarbon, derivatives thereof, and combinations thereof.

In certain embodiments, the chemically functionalized graphene sheets contain a chemical functional group selected from a derivative of an azide compound selected from the group consisting of 2-azidoethanol, 3-azidopropan-1-amine, 4-(2-azidoethoxy)-4-oxobutanoic acid, 2-azido-ethyl-2-bromo-2-methylpropanoate, chlorocarbonate, azidocarbonate, dichlorocarbene, carbene, aryne, nitrene, (R—)-oxycarbonyl nitrenes, where R=any one of the following groups,

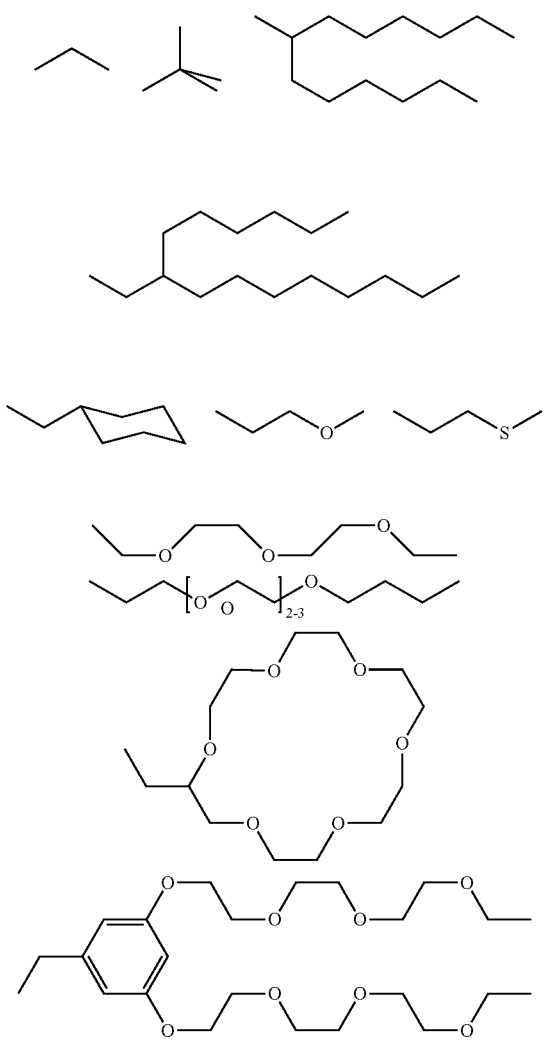

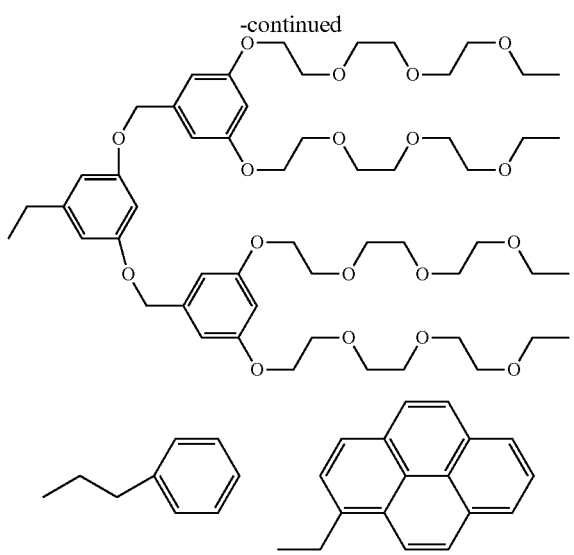

and combinations thereof.

In certain embodiments, the chemically functionalized graphene sheets contain a chemical functional group selected from an oxygenated group consisting of hydroxyl, peroxide, ether, keto, aldehyde, and combinations thereof.

In certain embodiments, the chemically functionalized graphene sheets contain a chemical functional group selected from the group consisting of —$SO_3H$, —COOH, —$NH_2$, —OH, —R'CHOH, —CHO, —CN, —COCl, halide, —COSH, —SH, —COOR', —SR', —$SiR'_3$, —Si(—OR'—)$_y$R'$_{3-y}$, —Si(—O—$SiR'_2$—)OR', —R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, derivatives thereof, and combinations thereof.

In certain embodiments, the chemically functionalized graphene sheets contain a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, derivatives thereof, and combinations thereof.

In certain embodiments, the chemically functionalized graphene sheets contain a chemical functional group selected from OY, NHY, O=C—OY, P=C—NR'Y, O=C—SY, O=C—Y, —CR'1-OY, N'Y or C'Y, a derivative thereof, or a combination thereof, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, R'N$^+$(R')$_3$X$^-$, R'$SiR'_3$, R'Si(—OR'—)$_y$R'$_{3-y}$, R'Si(—O—$SiR'_2$—)OR', R'—R", R'—N—CO, ($C_2H_4O$—)$_w$H, (—$C_3H_6O$—)$_w$H, (—$C_2H_4O$)$_w$—R', ($C_3H_6O$)$_w$—R', R', and w is an integer greater than one and less than 200.

In certain embodiments, the chemically functionalized graphene sheets contain a chemical functional group selected from the group consisting of 10,12-pentacosadiyn- 1-ol, 1-pyrenebutyric acid N-hydroxysuccinimide ester, 1-aminopyrene, derivatives thereof, and combinations thereof.

The process may further comprise a step of reducing the non-carbon content to less than 20% (preferably less than 5%) by weight using chemical, thermal, UV, or radiation-induced reduction means. For instance, one may optionally subject the long or continuous fiber to a heat treatment at a temperature of typically 200-700° C. to thermally reduce the non-carbon content.

In certain embodiments, the inter-plane spacing $d_{002}$ is from 0.4 nm to 1.2 nm, the non-carbon element content is from 1% to 20%, or physical density from 1.7 to 2.15 g/cm$^3$.

In certain embodiments, the integral graphene film has a thermal conductivity from 200 to 1,600 W/mK or an electrical conductivity from 600 to 15,000 S/cm; preferably and typically having a thermal conductivity of at least 350 W/mK or an electrical conductivity no less than 1,000 S/cm; further preferably and typically having a thermal conductivity of at least 600 W/mK or an electrical conductivity no less than 2,500 S/cm; still further preferably having a thermal conductivity of at least 1,000 W/mK or an electrical conductivity no less than 5,000 S/cm; and most preferably having a thermal conductivity of at least 1,200 W/mK, or an electrical conductivity no less than 8,000 S/cm.

In certain embodiments, the integral graphene film contains a combination of sp$^2$ and sp$^3$ electronic configurations. There are graphene edge-to-edge, edge-to-graphene plane, and graphene plane-to-graphene plane bonding (covalent bonds or π-π bonds) between functionalized graphene sheets.

The integral graphene film typically and preferably has a Young's modulus from 20 GPa to 250 GPa (more typically from 30 GPa to 150 GPa), or a tensile strength from 1.0 GPa to 3.5 GPa (more typically from 1.2 GPa to 3.0 GPa).

DESCRIPTION OF THE PREFERRED EMBODIMENTS

Figure 1:
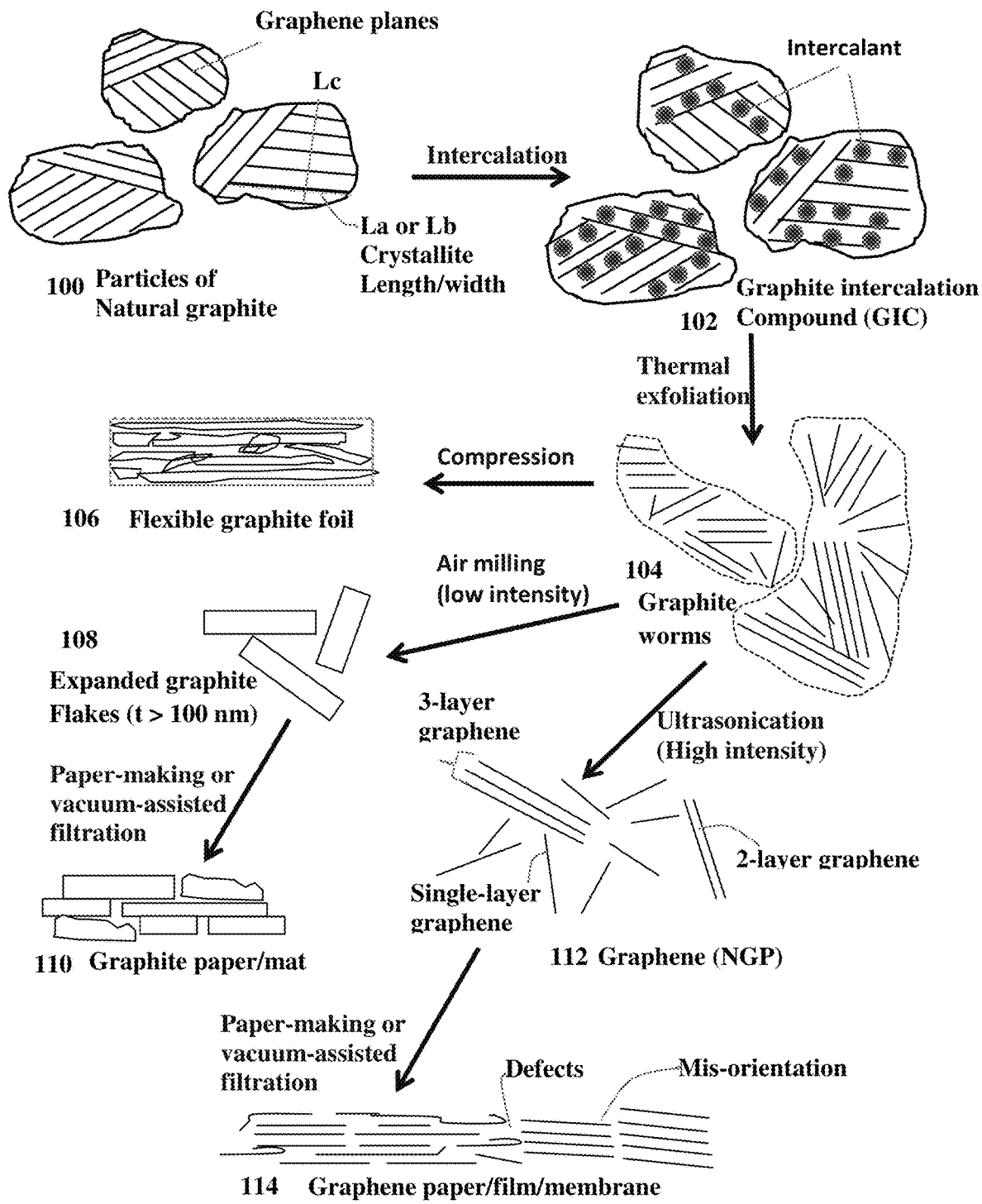
FIG. 1 Schematic drawing illustrating the processes for producing conventional paper, mat, film, and membrane of simply aggregated graphite or graphene flakes/platelets. All processes begin with intercalation and/or oxidation treatment of graphitic materials (e.g. natural graphite particles).
Figure 2A:
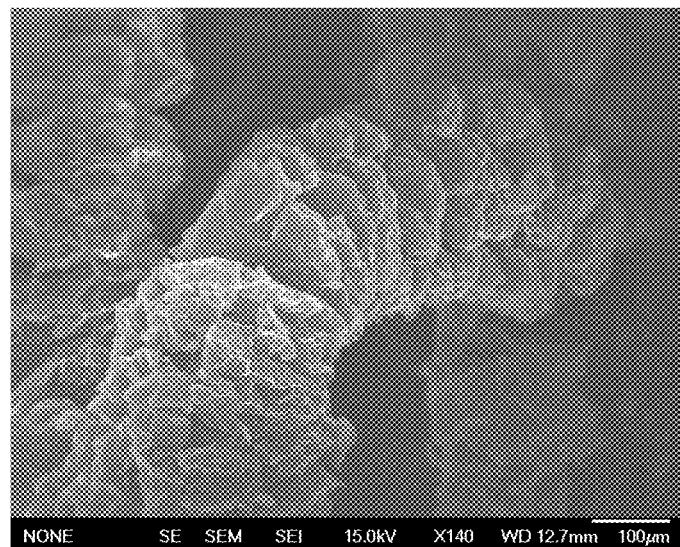
FIG. 2(a) A SEM image of a graphite worm sample after thermal exfoliation of graphite intercalation compounds (GICs) or graphite oxide powders.
Figure 2B:
FIG. 2(b) An SEM image of a cross-section of a flexible graphite foil, showing many graphite flakes with orientations not parallel to the flexible graphite foil surface and also showing many defects, kinked or folded flakes.

The present invention provides an integral graphene film comprising chemically functionalized graphene sheets that are chemically bonded or interconnected with one another having an inter-planar spacing $d_{002}$ from 0.36 nm to 1.5 nm as determined by X-ray diffraction and a non-carbon element content of 0.1% to 47% by weight, wherein said functionalized graphene sheets are substantially parallel to one another and parallel to an in-plane direction of said integral graphene film and said integral graphene film has a length from 1 cm to 10,000 m, a width from 1 cm to 5 m, a thickness from 2 nm to 500 μm (more typically and preferably from 10 nm to 200 μm), and a physical density from 1.5 to 2.2 g/cm$^3$ (more typically >1.9 g/cm$^3$).

The graphene sheets are typically interconnected with one another via chemical bonding or reactions between the chemically active functional groups attached to respective adjacent functional groups. These chemically active functional groups are capable of reacting with neighboring groups by forming covalent bonds, hydrogen bonds, and/or π-π bonds. The integral graphene film has a degree of graphene plane orientation greater than 87%, typically from 87% to approximately 99%.

The present invention also provides a process for producing an integral graphene film from chemically functionalized graphene sheets. In certain embodiments, the process comprises:

(a) preparing a graphene dispersion having chemically functionalized graphene sheets dispersed in a liquid medium (e.g. water or an organic solvent), wherein the chemically functionalized graphene sheets contain chemical functional groups attached thereto (on graphene sheet surfaces and/or edges) and a non-carbon element content of 0.1% to 47% by weight;

(b) dispensing and depositing a wet film of said graphene dispersion onto a supporting substrate, wherein the dispensing and depositing procedure includes mechanical shear stress-induced alignment of chemically functionalized graphene sheets along a film planar direction, and partially or completely removing the liquid medium from the wet film to form a dried graphene film comprising aligned chemically functionalized graphene sheets; and (c) using heat, electromagnetic waves (e.g. radio frequency waves, or microwaves), UV light, high-energy radiation (e.g. electron beam, Gamma ray, or X-ray), or a combination thereof to induce chemical reactions or chemical bonding between chemical functional groups attached to adjacent chemically functionalized graphene sheets in the dried graphene film to form the integral graphene film, wherein the integral graphene film comprises chemically functionalized graphene sheets that are chemically bonded or interconnected with one another having an inter-planar spacing $d_{002}$ from 0.36 nm to 1.5 nm as determined by X-ray diffraction and a non-carbon element content of 0.1% to 47% by weight, wherein the functionalized graphene sheets are substantially parallel to one another and parallel to a planar direction of said integral graphene film and the integral graphene film has a length from 10 mm to 10,000 m, a width from 1 cm to 5 m, a thickness from 1 cm to 500 m, and a physical density from 1.5 to 2.2 g/cm$^3$.

Step (a) includes dispersing chemically functionalized graphene sheets in a liquid medium, such as water or organic solvent. The production of graphene sheets is well-known in the art. Some details about how to prepare graphene dispersion in step (a) of the invented process are presented below.

As an example, a graphite intercalation compound (GIC) or graphite oxide may be obtained by immersing powders or filaments of a starting graphitic material in an intercalating/oxidizing liquid medium (e.g. a mixture of sulfuric acid, nitric acid, and potassium permanganate) in a reaction vessel. The starting graphitic material may be selected from natural graphite, artificial graphite, mesophase carbon, mesophase pitch, mesocarbon microbead, soft carbon, hard carbon, coke, carbon fiber, carbon nanofiber, carbon nanotube, or a combination thereof.

When the starting graphite powders or filaments are mixed in the intercalating/oxidizing liquid medium, the resulting slurry is a heterogeneous suspension and appears dark and opaque. When the oxidation of graphite proceeds at a reaction temperature for a sufficient length of time (4-120 hours at room temperature, 20-25° C.), the reacting mass can eventually become a suspension that appears slightly green and yellowish, but remain opaque. If the degree of oxidation is sufficiently high (e.g. having an oxygen content between 20% and 50% by weight, preferably between 30% and 50%) and all the original graphene planes are fully oxidized, exfoliated and separated to the extent that each oxidized graphene plane (now a graphene oxide sheet or molecule) is surrounded by the molecules of the liquid medium, one obtains a GO gel.

The aforementioned features are further described and explained in detail as follows: As illustrated in FIG. 1, a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1, different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm$^3$ for most applications.

In one prior art process, the exfoliated graphite (or mass of graphite worms) is re-compressed by using a calendaring or roll-pressing technique to obtain flexible graphite foils (106 in FIG. 1), which are typically 100-300 μm thick.

Largely due to the presence of defects, commercially available flexible graphite foils normally have an in-plane electrical conductivity of 1,000-3,000 S/cm, through-plane (thickness-direction or Z-direction) electrical conductivity of 15-30 S/cm, in-plane thermal conductivity of 140-300 W/mK, and through-plane thermal conductivity of approximately 10-30 W/mK. These defects are also responsible for the low mechanical strength (e.g. defects are potential stress concentration sites where cracks are preferentially initiated). These properties are inadequate for many thermal management applications and the present invention is made to address these issues. In another prior art process, the exfoliated graphite worm may be impregnated with a resin and then compressed and cured to form a flexible graphite composite, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene (also illustrated as 112 in FIG. 1). An NGP is composed of a graphene sheet or a plurality of graphene sheets with each sheet being a two-dimensional, hexagonal structure of carbon atoms.

Further alternatively, with a low-intensity shearing, graphite worms tend to be separated into the so-called expanded graphite flakes (108 in FIG. 1) having a thickness>100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes.

For the purpose of defining the geometry and orientation of an NGP, the NGP is described as having a length (the largest dimension), a width (the second largest dimension), and a thickness. The thickness is the smallest dimension, which is no greater than 100 nm, preferably smaller than 10 nm and most preferably 0.34 nm-1.7 nm in the present application. When the platelet is approximately circular in shape, the length and width are referred to as diameter. In the presently defined NGPs, both the length and width can be smaller than 1 m, but can be larger than 200 m.

A mass of multiple NGPs (including discrete sheets/platelets of single-layer and/or few-layer graphene or graphene oxide) may be readily dispersed in water or a solvent and then made into a graphene paper (114 in FIG. 1) using a paper-making process. Many discrete graphene sheets are folded or interrupted (not integrated), most of platelet orientations being not parallel to the paper surface. The existence of many defects or imperfections leads to poor electrical and thermal conductivity in both the in-plane and the through-plane (thickness-) directions.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "Halogenated Graphenes: Rapidly Growing Family of Graphene Derivatives" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly made into a sheet of paper or a roll of paper.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene fiber can contain pristine or non-pristine graphene and the invented method allows for this flexibility.

Several methods have been developed to chemically functionalize graphene sheets (including pristine graphene, graphene oxide, and reduced graphene oxide or rGO). The reader may consult this review article: Vasilios Georgakilas, et al. "Functionalization of Graphene: Covalent and Non-Covalent Approaches, Derivatives and Applications," Chem. Rev., 2012, 112 (11), pp 6156-6214; DOI: 10.1021/cr3000412.

Pristine graphene is one of the most chemically inert materials because high energy barriers need to be overcome due to the rigid planar structure and remarkable interlayer conjugation. By diazonium chemistry and photochemistry, various functional groups have been grafted onto graphene. For the diazonium chemistry, stirring-assisted solution reaction may be tedious. For the photochemistry, either a focused laser spot may be used to generate a sufficiently high intensity, resulting in a localized functionalization of graphene sheets. A heat-initiated chemical reaction can be used to functionalize pristine graphene prepared by chemical vapor deposition (CVD) or liquid phase exfoliation.

The organic covalent functionalization reactions of graphene include two general routes: (a) the formation of covalent bonds between free radicals or dienophiles and C—C bonds of pristine graphene and (b) the formation of covalent bonds between organic functional groups and the oxygen groups of GO. The most attractive organic species for the reaction with sp2 carbons of graphene are organic free radicals and dienophiles. Usually both are intermediate reactive components that are produced under certain conditions in the presence of graphene.

Upon heating of a diazonium salt, a highly reactive free radical is produced, which attacks the sp2 carbon atoms of graphene, thereby forming a covalent bond. This reaction can be used to decorate graphene with nitrophenyls. The strong covalent binding of the nitrobenzyl group on graphene may be detected by X-ray photoelectron spectroscopy (XPS). The N1s XPS spectrum of the functionalized graphene normally exhibits two peaks at 406 and 400 eV that correspond to the nitrogen of $NO_2$ and the partially reduced nitrogen of the product, respectively. The reactions with diazonium salts have been applied to the functionalization of chemically or thermally converted graphene, single graphene sheets obtained by micromechanical cleavage from bulk graphite, and epitaxial graphene.

Hydroxylated aryl groups can be grafted covalently on graphene by the diazonium addition reaction. The ratio between carbon atoms with sp2 and sp3 hybridization in the graphitic lattice is an indication of the degree of oxidation or a covalent functionalization reaction. This ratio may be estimated using Raman spectroscopy as the ID/IG ratio, where ID and IG are the intensities of the peaks at ~1350 and 1580 $cm^{-1}$, which correspond to the number of sp3 and sp2 C atoms, respectively. Graphene is often defined as a pristine two-dimensional sp2 hybridized carbon sheet; as such the coexistence of sp3 carbons in the lattice are inherently classified as defects, where these defects can be on the basal edges or inside defects in the plane. For the modification described above, the ID/IG ratio is increased from 1.7 to ~2 after functionalization by diazonium addition.

An alternative free radical addition method includes the reaction of benzoyl peroxide with graphene sheets. Graphene sheets may be deposited on a silicon substrate and immersed in a benzoyl peroxide/toluene solution. The reaction is then initiated photochemically by focusing an Ar-ion laser beam onto the graphene sheets in the solution. The attachment of the phenyl groups is directly indicated by the appearance of a strong D band at 1343 $cm^{-1}$. The appearance of this D band is due to the formation of sp3 carbon atoms in the basal plane of graphene by covalent attachment of phenyl groups.

Figure 5A:
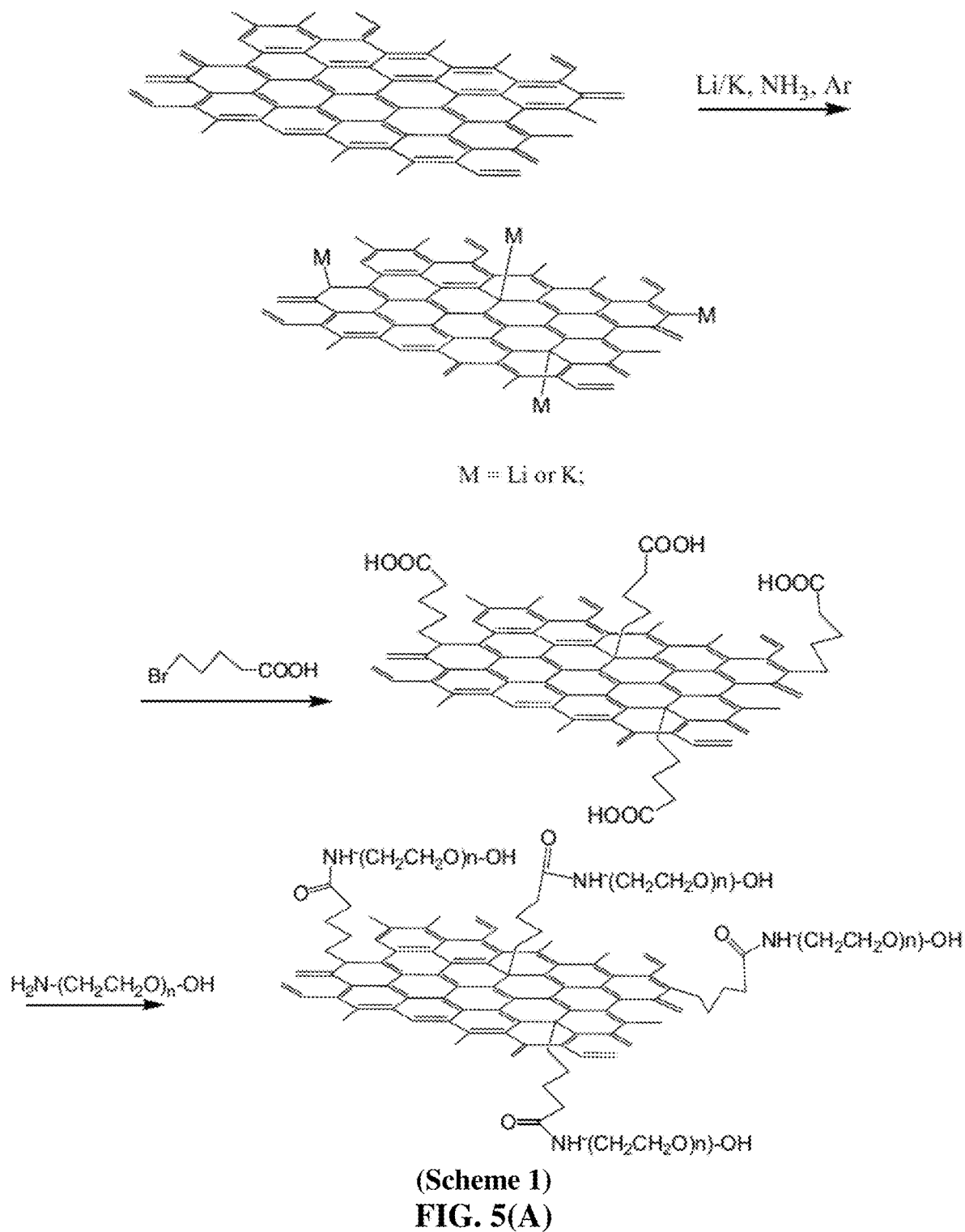
FIG. 5(a) Chemical functionalization of graphene sheets, Scheme 1.

A type of metalized graphene, potassium graphene, may be used in the reaction with 1-iododecane to produce dodecylated graphene (Scheme 1, FIG. 5(A)). The FT-IR spectra can be used to confirm presence of C—H stretching bands at 2800-3000 $cm^1$ associated with the dodecyl groups. TGA may indicate a weight loss of 15%, which corresponds to about one dodecyl group per 78 graphite carbon atoms. The resulting dodecylated graphene is soluble in chloroform, benzene, and 1,2,4-trichlorobenzene. Additionally, its solubility in water can be achieved by the reaction of potassium graphene with 5-bromovaleric acid and subsequent reaction with amine-terminated PEG (see Scheme 1).

Top-down approaches may be used to prepare chemically-functionalized graphene with an objective to make them dispersible in a selected liquid medium. For instance, graphene oxide (GO) nanosheets having ample oxygen functionalities in the basal plane and along the edges may be selectively targeted for the chemical functionalization. In a first approach, for instance, octadecylamine (ODA) can be covalently grafted on the edges of reduced graphene oxide (rGO) via amide linkage and this can be confirmed by FTIR and XPS analyses. In a second approach, oxygen functionalities in the basal plane of GO can be selected to tether the octadecylamine via covalent, charge-induced electrostatic and hydrogen linkages between the amino group of ODA and epoxy, carboxylic and hydroxyl functionalities of GO, respectively. The chemical and structural features of products may be examined by FTIR, $^{13}C$ NMR, XPS, XRD and HRTEM. In a third approach, rGO can be covalently functionalized with imidazolium ionic liquids having bis(salicylato)borate, oleate and hexafluorophosphate anions. Chemical functionalized graphene may also be obtained by the reaction of the residual epoxide and carboxyl functional groups on the hydrazine-reduced graphene sheets with hydroquinone.

Figure 5B:
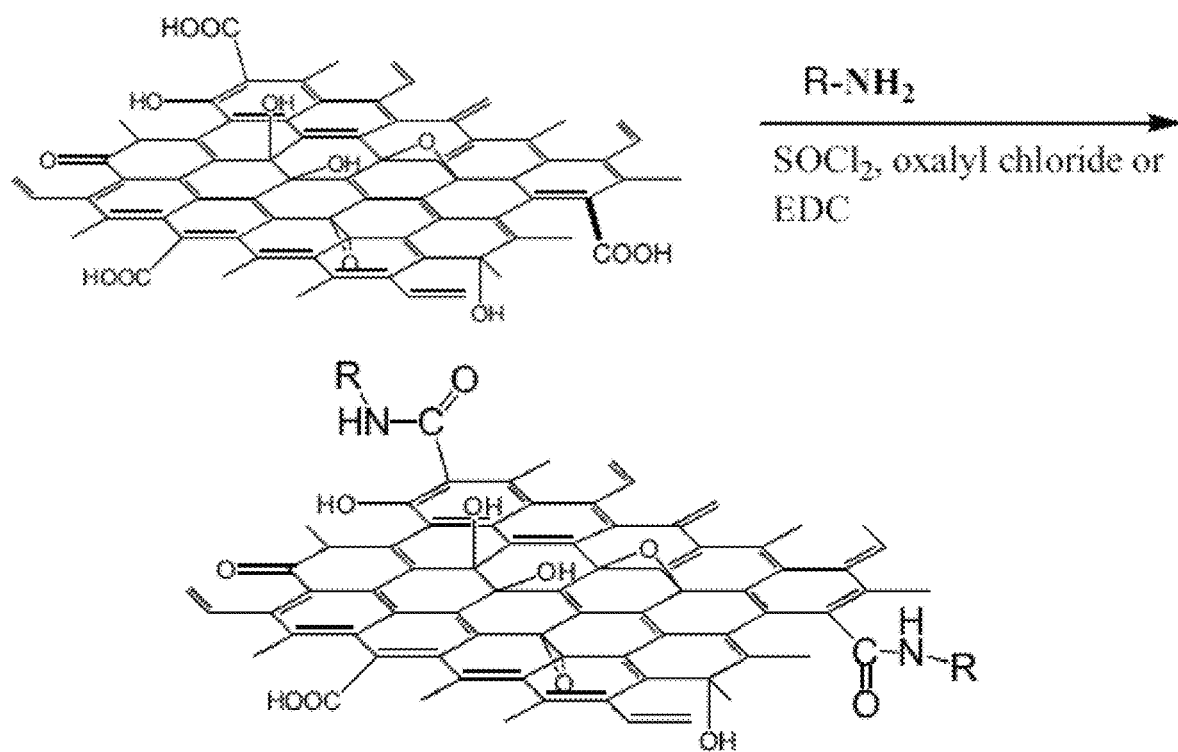
FIG. 5(b) Chemical functionalization of graphene sheets, Scheme 2.

A simple method often used for the functionalization of graphene is based on reactions of the carboxyl groups, present in GO and located at the edges of graphene sheets, with various amines or alcohols. Reactions of the graphene carboxyl groups with amines, leading to the formation of amides, were performed via various more reactive intermediates (see Scheme 2, FIG. 5(B)). As one example, to prepare graphene soluble in non-polar solvents, the acid-treated graphene is reacted with an excess of thionyl chloride ($SOCl_2$) and subsequently heated with dodecylamine. Defected graphene requires a harsher acid treatment over longer periods to enable its further functionalization. The functionalization may be confirmed by a shift in the C=O stretching band to 1650 $cm^1$ due to the amide band and an appearance of C—H and N—H stretching bands at 2800 and 3300 $cm^1$ as observed by FT-IR spectroscopy. Dodecylamide-functionalized graphene is dispersible in dichlormethane, carbon tetrachloride ($CCl_4$) and tetrahydrofuran (THF). A similar approach via an acyl chloride intermediate may also be used for the modification of graphite oxide with octadecylamine (ODA).

Figure 5C:
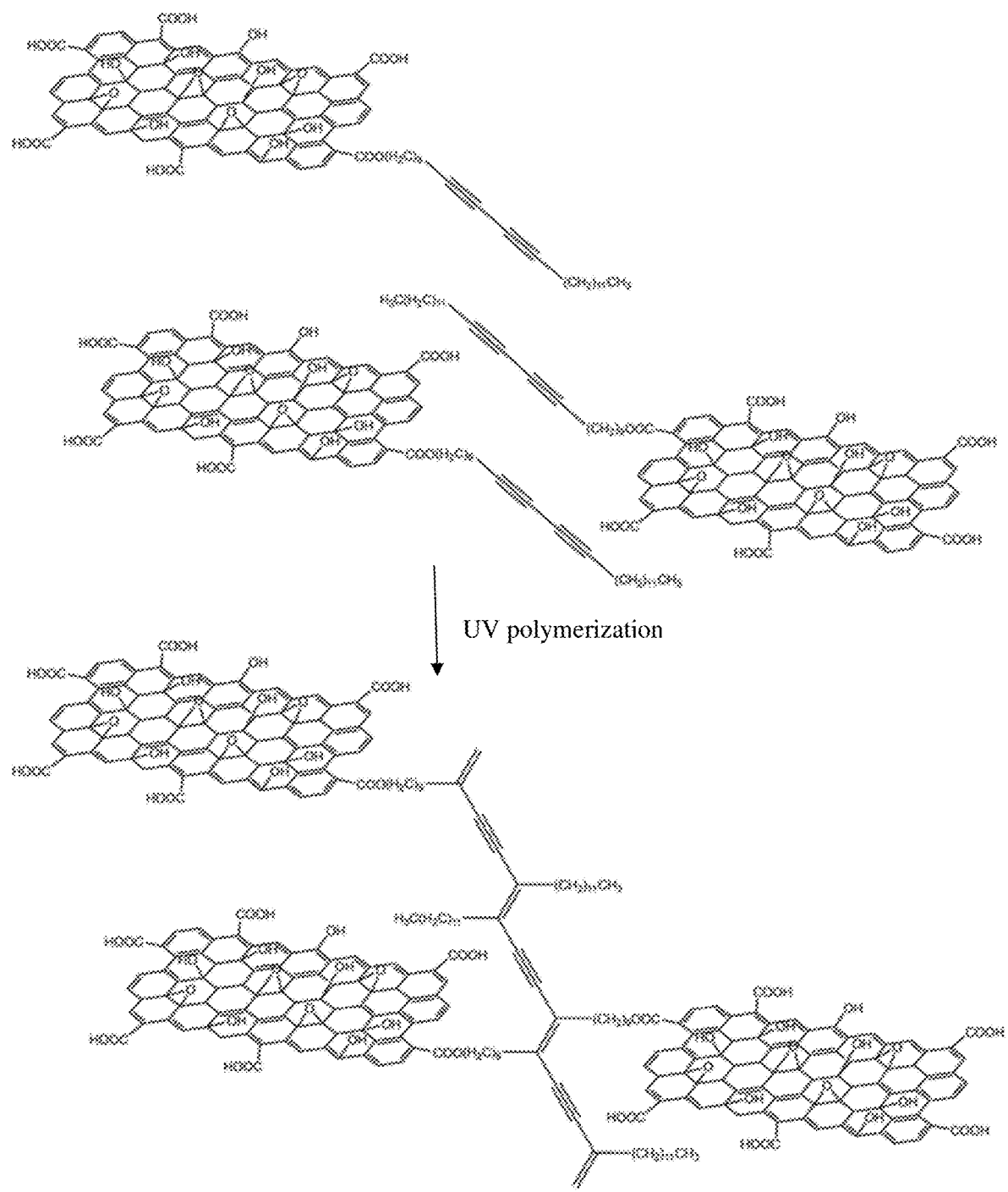
FIG. 5(c) An example to illustrate one mechanism with which neighboring chemically functionalized graphene sheets are chemically interconnected together.

In yet another approach, graphene oxide sheets are immersed in a solution of 10,12-pentacosadiyn-1-ol [PCO, $CH_3(CH_2)_{11}C$—C—C—$C(CH_2)_8CH_2OH$] to form a graphene dispersion. The dispersion is then coated on a PET substrate under a high shear stress and high shear rate condition (shear rate from 0.1 to $10^5$ $sec^{-1}$, preferably from $10^2$ to $10^4$ $sec^{-1}$) to form a filament comprising highly oriented GO sheets lightly coated with PCO. As illustrated in Scheme 3, FIG. 5(C), the filament, after drying, may be exposed to UV light to provide a fiber of PCO-GO sheets in which the diacetylene groups of PCO have reacted by 1,4-addition polymerization. Subsequently, the fiber may be immersed in hydroiodic acid (HI) to reduce the PCO-GO sheets into graphene-PCO sheets. Then, the fiber of graphene-PCO sheets is immersed successively into 1-pyrenebutyric acid N-hydroxysuccinimide ester (PSE) and 1-aminopyrene (AP) solutions, thereby providing a fiber of interconnected graphene sheet in which the PSE and AP have bonded through π-π interactions with neighboring graphene sheets and reacted to provide PSE-AP covalent bonds. The ratio of π-π interactions through PSE-AP derived bonding and covalent bonding resulting from PCO can be optimized by adjusting the immersion times in the respective solutions.

The above discussion indicates that chemical functionalization plays at least two roles in the instant invention. One is to make a graphene material (e.g. pristine graphene, GO, RGO, graphene fluoride, etc.) dispersible in a desired liquid medium so that we can produce a graphene dispersion for subsequent production of graphene films. A second role is to create bridging functional groups that enable chemical reactions, merging, and/or cross-linking between functionalized graphene sheets to produce graphene fibers consisting of essentially interconnected graphene sheets to impart high strength, high elasticity, high electric conductivity and high thermal conductivity.

Step (b) includes dispensing and depositing a wet film of the graphene dispersion onto a supporting substrate. This can be accomplished by using casting, slot-die coating, comma coating, reverse-roll coating, ultrasonic spraying, or pressure air-assisted spraying, etc.). In these operations, the dispensing and depositing procedure preferably includes using mechanical shear stress to align or orient the chemically functionalized graphene sheets along the filament axis direction. In certain embodiments, the coating head can be operated to create a high shear stress and a high strain rate between the dispensed graphene dispersion and the supporting substrate that undergoes a high relative motion relative to the coating head.

This mechanical stress/strain condition enables all the constituent graphene sheets or graphene domains to be aligned along a graphene film planar direction and be substantially parallel to one another. More significantly, the graphene sheets are closely packed to facilitate chemical reactions or cross-linking (interconnection) between graphene sheets. In other words, not only the graphene planes in a particular domain are parallel to one another, they are also parallel to the graphene planes in the adjacent domain. The crystallographic c-axes of these two sets of graphene planes are pointing along substantially identical direction. Thus, the integral graphene film contains a first graphene domain containing bonded graphene sheets parallel to one another and having a first crystallographic c-axis, and a second graphene domain containing bonded graphene sheets parallel to one another and having a second crystallographic c-axis wherein the first crystallographic c-axis and the second crystallographic c-axis are inclined with respect to each other at an angle less than 10 degrees or better than 90% degree of orientation (mostly less than 5%, or better than 95% degree of orientation, and even more often less than 1 degree, or better than 99% degree of orientation).

In certain preferred embodiments, Step (b) contains dispensing the graphene dispersion onto a surface of an application roller rotating in a first direction at a first line velocity (the line speed at the external surface of the application roller) to form an applicator layer of graphene and transferring this applicator layer of graphene to a surface of a supporting film driven in a second direction opposite to the first direction at a second line velocity, forming a wet layer of graphene on the supporting film.

Figure 4A:
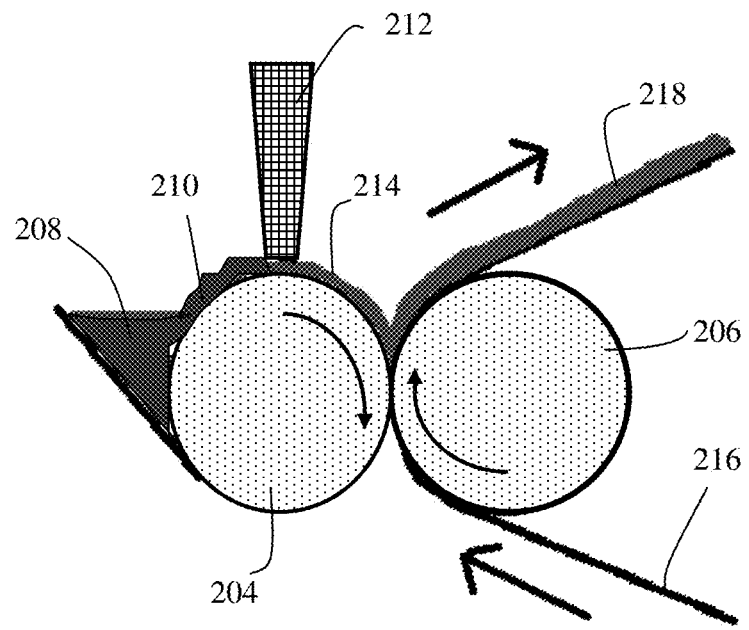
FIG. 4(a) Schematic of a reverse roll-based graphene layer transfer apparatus for producing an integral graphene film composed of highly oriented functionalized graphene sheets.

As schematically illustrated in FIG. 4(A), as a preferred embodiment, the process of producing an integral graphene film begins with preparation of a graphene that is delivered to a trough 208. The rotational motion of an application roller 204 in a first direction enables the delivery of a continuous layer 210 of graphene dispersion onto the exterior surface of the application roller 204. An optional doctor's blade 212 is used to regulate the thickness (amount) of an applicator layer 214 of graphene. This applicator layer is continuously delivered to the surface of a supporting film 216 moving in a second direction (e.g. driven by a counter-rotating roller 206, rotating in a direction opposite to the first direction) to form a wet layer 218 of graphene. This wet layer of graphene is then subjected to a liquid removal treatment (e.g. under a heating environment and/or being vacuum-pumped).

In a preferred embodiment, the supporting film is driven by a counter-rotating supporting roller (e.g. 206 in FIG. 4(A)) disposed at a working distance from the application roller and rotating in the second direction opposite to the first direction. The speed at the external surface of this supporting roller dictates the second line velocity (of the supporting film). Preferably, the supporting film is fed from a feeder roller and the dried layer of graphene supported by the supporting film is wound on a winding roller and the process is conducted in a roll-to-roll manner.

Figure 4B:
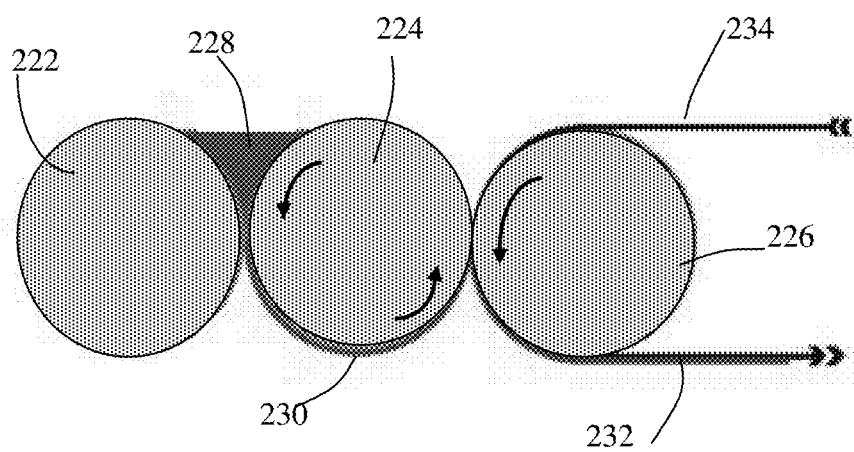
FIG. 4(b) Schematic of another reverse roll-based graphene layer transfer apparatus for producing an integral graphene film composed of highly oriented functionalized graphene sheets.
Figure 4C:
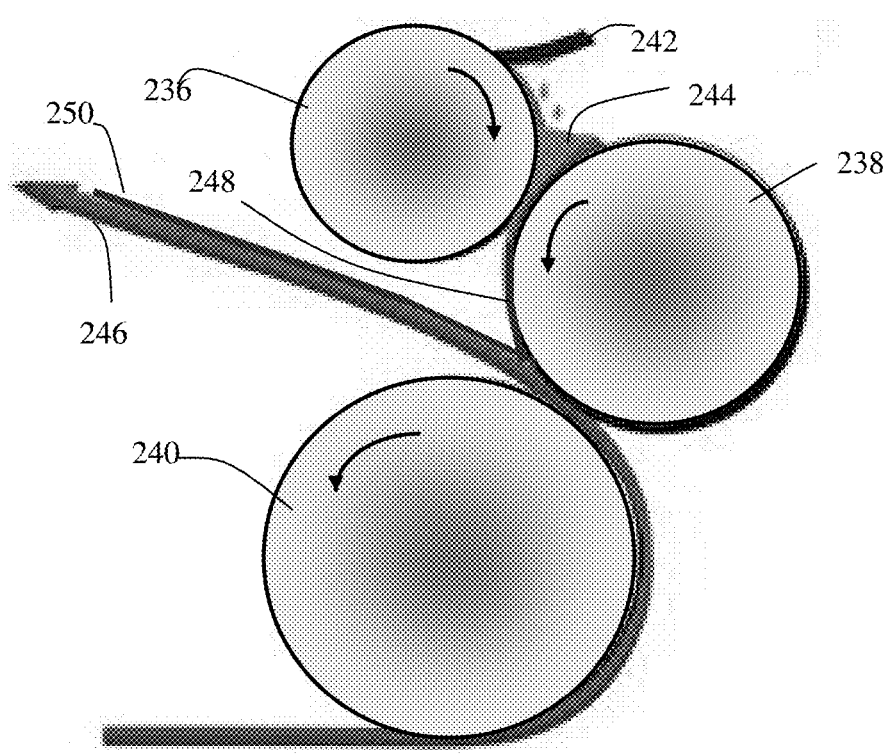
FIG. 4(c) Schematic of yet another reverse roll-based graphene layer transfer apparatus for producing an integral graphene film composed of highly oriented functionalized graphene sheets.
Figure 4D:
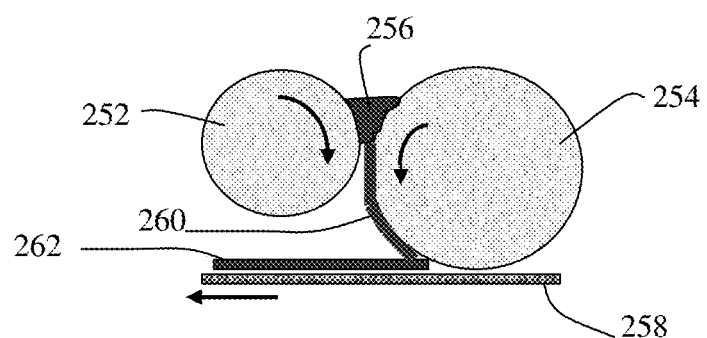
FIG. 4(d) Schematic of still another reverse roll-based GO layer transfer apparatus for producing an integral graphene film composed of highly oriented functionalized graphene sheets.

This process is further illustrated in FIG. 4(B), FIG. 4(C), and FIG. 4(D). In a preferred embodiment, as illustrated in FIG. 4(B), the graphene dispersion trough 228 is naturally formed between an application roller 224 and a metering roller 222 (also referred to as a doctor's roller). The relative motion or rotation of the application roller 224, relative to the metering roller 222, at a desired speed generates an applicator layer 230 of graphene on the exterior surface of the application roller 224. This applicator layer of graphene is then transferred to form a wet layer 232 of graphene on the surface of a supporting film 234 (driven by a supporting roller 226 counter-rotating in a direction opposite to the rotational direction of the applicator roller 224). The wet layer may then be subjected to a drying treatment.

In another preferred embodiment, as illustrated in FIG. 4(C), the graphene dispersion trough 244 is naturally formed between an application roller 238 and a metering roller 236. The relative motion or rotation of the application roller 238, relative to the metering roller 236, at a desired speed generates an applicator layer 248 of graphene on the exterior surface of the application roller 238. A doctor's blade 242 may be used to scratch off any graphene dispersion carried on the exterior surface of the metering roller 236. This applicator layer 248 of graphene is then transferred to form a wet layer 250 of graphene on the surface of a supporting film 246 (driven by a supporting roller 240 counter-rotating in a direction opposite to the rotational direction of the applicator roller 238). The wet layer may then be subjected to a drying treatment.

In yet another preferred embodiment, as illustrated in FIG. 4(D), the graphene dispersion trough 256 is naturally formed between an application roller 254 and a metering roller 252. The relative motion or rotation of the application roller 254, relative to the metering roller 252, at a desired speed generates an applicator layer 260 of graphene the exterior surface of the application roller 254. This applicator layer 260 of graphene is then transferred to form a wet layer 262 of graphene on the surface of a supporting film 258, driven to move in a direction opposite to the tangential rotational direction of the applicator roller 254. This supporting film 258 may be fed from a feeder roller (not shown) and taken up (wound) on a winding roller (not shown), which may also be a driving roller. There would be at least 4 rollers in this example. There can be a heating zone after the wet layer of graphene is formed to at least partially remove the liquid medium (e.g. water or an organic solvent) from the wet layer to form a dried layer of graphene.

In some embodiments, the step of dispensing the graphene dispersion onto the surface of the application roller includes using a metering roller and/or a doctor's blade to provide a desired thickness of the applicator layer of graphene on the application roller surface. In general, the process includes operating 2, 3, or 4 rollers. Preferably, the process includes a reverse roll coating procedure.

It may be noted that the velocity ratio, defined as (the second line velocity)/(first line velocity), is from 1/5 to 5/1. If the external surface of the application roller moves at the same speed as the linear movement speed of the supporting film, then the velocity ratio is 1/1 or unity. If, as an example, the external surface of the application roller moves at a speed three times as fast as the linear movement speed of the supporting film, then the velocity ratio is 3/1. As a consequence, the transferred wet layer of graphene would be approximately 3-fold in thickness as compared to the applicator layer of GO. Quite unexpectedly, this enables the production of much thicker layer yet still maintaining a high degree of graphene sheet orientation in the wet layer, the dried layer, and the subsequently produced integral graphene film. This is a highly significant and desirable outcome since a high degree of graphene sheet orientation (e.g. >95%) could not be achieved with thick films (e.g. >50 μm in thickness) by using casting or other coating techniques such as comma coating and slot-die coating. In certain embodiments, the velocity ratio is greater than 1/1 and less than 10/1. Preferably, the velocity ratio is greater than 1/1 and equal to or less than 5/1.

Step (c) entails using heat, electromagnetic waves (e.g. radio frequency waves or microwaves), UV light, high-energy radiation (e.g. electron beam, Gamma ray, or X-ray), or a combination thereof to induce chemical reactions or chemical bonding between chemical functional groups attached to adjacent chemically functionalized graphene sheets to form the integral graphene film. The chemical functional groups and the chemical reaction conditions (including graphene sheet orientation, close-packing, etc.) enable the formation of an integral graphene film comprising chemically functionalized graphene sheets that are chemically interconnected with one another having an inter-planar spacing $d_{002}$ from 0.36 nm to 1.5 nm as determined by X-ray diffraction and a non-carbon element content of 0.1% to 40% by weight. The functionalized graphene sheets are substantially parallel to one another and parallel to the graphene fill plane direction. The integral graphene film has a physical density from 1.5 to 2.25 g/cm$^3$, more typically from 2.0 to 2.25 g/cm$^3$, and most typically from 2.1 to 2.25 g/cm$^3$.

In certain embodiments, chemical functionalization of graphene sheets is allowed to occur after the wet or dried graphene film is formed. Thus, the invention also provides a process for producing an integral graphene film from initially un-functionalized graphene sheets. In certain embodiments, the process comprises:
 (a) preparing a graphene dispersion having graphene sheets dispersed in a fluid medium (e.g., water or an organic solvent);
 (b) dispensing and depositing a wet layer of the graphene dispersion onto a supporting substrate, wherein the dispensing and depositing procedure includes mechanical shear stress-induced alignment of the graphene sheets along a film planar direction, and partially or completely removing the fluid medium from the wet film to form a relatively dried film comprising aligned graphene sheets;
 (c) bringing the wet film or dried film in contact with a chemical functionalizing agent so as to produce a film of chemically functionalized graphene sheets having chemical functional groups attached thereto and a non-carbon element content (e.g. H, O, N, B, P, Cl, F, Br, I, S, etc.) of 0.1% to 47% by weight; and
 (d) using heat, electromagnetic waves (e.g. radio frequency waves, or microwaves), UV light, high-energy radiation (e.g. electron beam, Gamma ray, or X-ray), or a combination thereof to induce chemical reactions or chemical bonding between chemical functional groups attached to adjacent chemically functionalized graphene sheets to form the integral graphene film, wherein the integral graphene film comprises chemically functionalized graphene sheets that are chemically bonded or interconnected with one another having an inter-planar spacing $d_{002}$ from 0.36 nm to 1.5 nm as determined by X-ray diffraction and a non-carbon element content of 0.1% to 47% by weight, wherein the functionalized graphene sheets are substantially parallel to one another and parallel to a planar direction of the integral graphene film and the integral graphene film has a length from 1 cm to 10,000 m, a width from 1 cm to 5 m, a thickness from 10 nm to 500 m, and a physical density from 1.5 to 2.2 g/cm$^3$.

In this process, graphene sheets are not functionalized initially. They are functionalized after the graphene sheets are made into a film.

A wide variety of chemical functional groups can be chemically attached to the edges and/or planes of graphene sheets to enable interconnection between graphene sheets. For instance, in certain embodiments, the chemically functionalized graphene sheets in the graphene film contain a chemical functional group selected from the group consisting of alkyl or aryl silane, alkyl or aralkyl group, hydroxyl group, carboxyl group, carboxylic group, amine group, sulfonate group (—SO$_3$H), aldehydic group, quinoidal, fluorocarbon, derivatives thereof, and combinations thereof.

In certain embodiments, the chemically functionalized graphene sheets contain a chemical functional group selected from a derivative of an azide compound selected from the group consisting of 2-azidoethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R—)-oxycarbonyl nitrenes, where R=any one of the following groups,

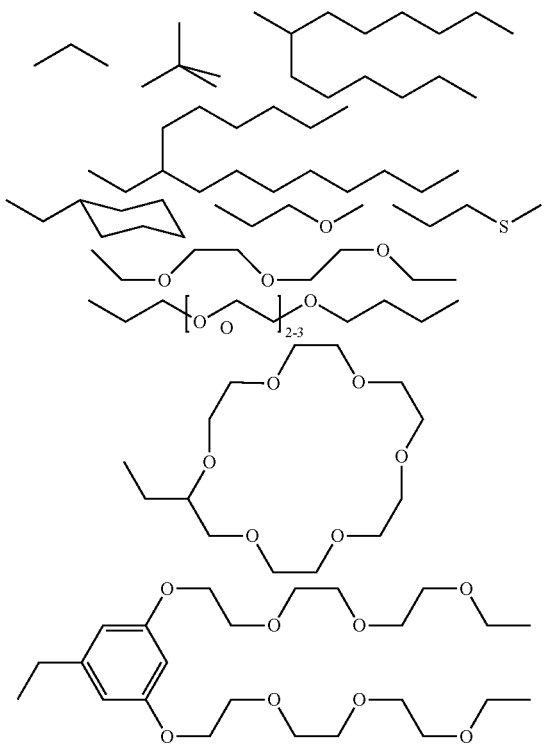

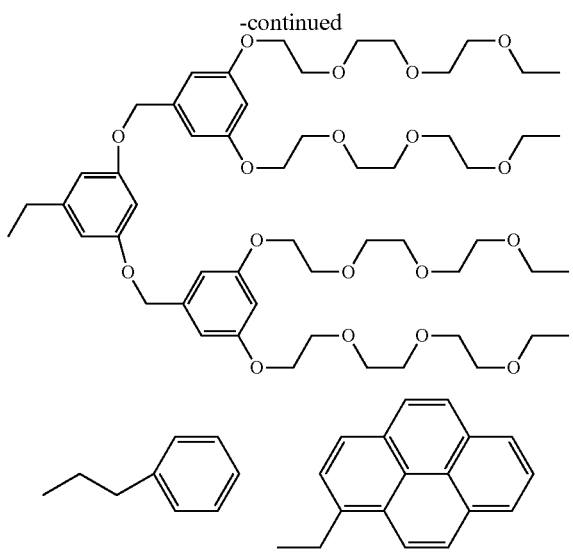

and combinations thereof.

In certain embodiments, the chemically functionalized graphene sheets contain a chemical functional group selected from an oxygenated group consisting of hydroxyl, peroxide, ether, keto, aldehyde, and combinations thereof.

In certain embodiments, the chemically functionalized graphene sheets contain a chemical functional group selected from the group consisting of —$SO_3H$, —COOH, —$NH_2$, —OH, —R'CHOH, —CHO, —CN, —COCl, halide, —COSH, —SH, —COOR', —SR', —$SiR'_3$, —Si(—OR'—)$_y$R'$_{3-y}$, —Si(—O—SiR'$_2$—)OR', —R''', Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and Z is carboxylate or trifluoroacetate, derivatives thereof, and combinations thereof.

In certain embodiments, the chemically functionalized graphene sheets contain a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, derivatives thereof, and combinations thereof.

In certain embodiments, the chemically functionalized graphene sheets contain a chemical functional group selected from OY, NHY, O=C—OY, P=C—NR'Y, O=C—SY, O=C—Y, —CR'1-OY, N'Y or C'Y, a derivative thereof, or a combination thereof, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R'', R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

In certain embodiments, the chemically functionalized graphene sheets contain a chemical functional group selected from the group consisting of 10,12-pentacosadiyn-1-ol, 1-pyrenebutyric acid N-hydroxysuccinimide ester, 1-aminopyrene, derivatives thereof, and combinations thereof.

The process may further comprise a step (d) of compressing the integral graphene film after formation to increase the physical density of the film and further align the constituent graphene sheets.

The process may further comprise a step of reducing the non-carbon content to less than 20% (preferably less than 5%) by weight using chemical, thermal, UV, or radiation-induced reduction means. For instance, one may optionally subject the integral graphene film to a heat treatment at a temperature typically 200-700° C. to thermally reduce the non-carbon content.

The functionalized graphene sheet-derived integral graphene film and related processes have the following characteristics and advantages:

(1) The presently invented integral graphene film is an integrated graphene phase composed of chemically interconnected graphene sheets that are essentially oriented parallel to one another. The graphene sheets are also closely packed to exhibit a high physical density. This conclusion was drawn after an extensive investigation using a combination of SEM, TEM, selected area diffraction (with a TEM), X-ray diffraction, atomic force microscopy (AFM), Raman spectroscopy, and FTIR.

(2) The graphene paper sheet prepared by the prior art processes (e.g. vacuum-assisted filtration or any other paper-making procedure) are a simple aggregate/stack of multiple discrete platelets or sheets of graphene, GO, or RGO that are just mechanically stacked together. In contrast, the present graphene film of the present invention is a fully integrated monolith containing essentially all the graphene sheets being chemically interconnected.

Figure 3A:
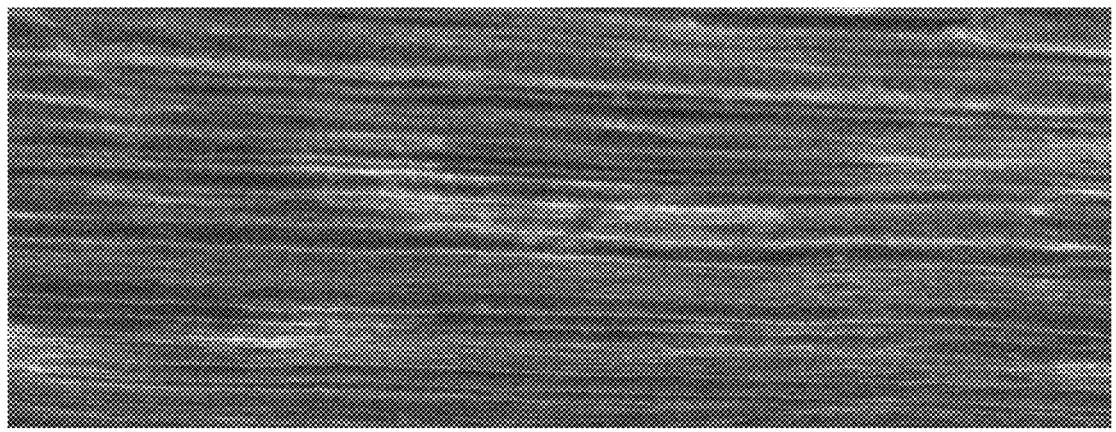
FIG. 3(a) A SEM image of an integral graphene film produced from chemically functionalized GO sheets.
Figure 3B:
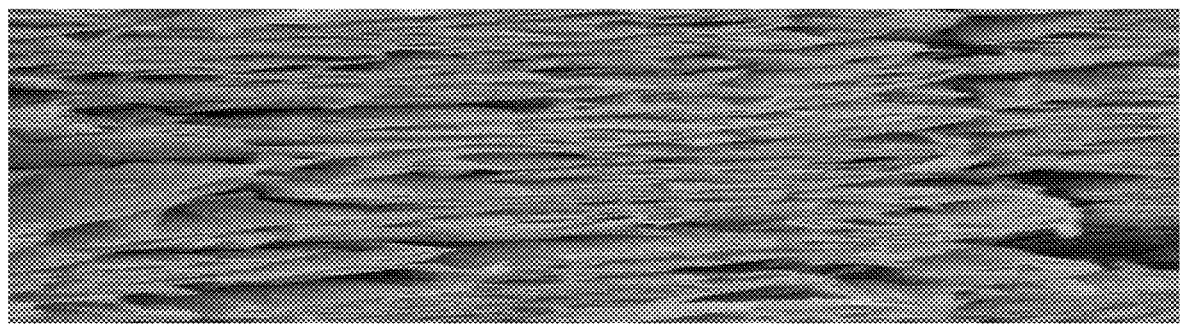
FIG. 3(b) A SEM image of a cross-section of a conventional graphene paper prepared from discrete graphene sheets/platelets using a paper-making process (e.g. vacuum-assisted filtration). The image shows many discrete graphene sheets being folded or interrupted (not integrated), with orientations not parallel to the film/paper surface and having many defects or imperfections.

(3) With these paper-making processes, the constituent graphene sheets of the resulting "graphene platelet sheet" or "paper" have many voids or gaps between discrete flakes/sheets/platelets (e.g. FIG. 3(b).

(4) In contrast, the preparation of the presently invented graphene film structure involves chemically functionalizing graphene sheets so that they that possess highly reactive functional groups (e.g. —OH, —$NH_2$, and —COOH) at the edge and on graphene planes. These neighboring graphene sheets are highly aligned and closely packed together. When being controllably heated or exposed to UV or high-energy radiation, these highly reactive functional groups from adjacent graphene sheets react and chemically join with one another in lateral directions along graphene planes (in an edge-to-edge manner) and between graphene planes (in an edge-to-plane or plane-to-plane manner).

Not wishing to be bound by the theory, we offer another plausible chemical linking mechanism as illustrated in FIG. 3(d), where only 2 aligned functionalized graphene sheets are shown as an example, although a large number of graphene sheets can be chemically linked together to form a graphene film. Further, chemical linking could also occur face-to-face or face-to-edge, not just edge-to-edge. These linking and merging reactions proceed in such a manner that the graphene sheets can be chemically merged, linked, and integrated into one single entity or monolith.

Due to these unique chemical compositions (including non-carbon content), morphology, crystal structure (including inter-graphene spacing), and microstructural features (e.g. defects, chemical bonding and no gap between graphene sheets, exceptionally high degree of orientation of graphene sheets, and no interruptions in graphene planes), the integral graphene film has a unique combination of outstanding thermal conductivity, electrical conductivity, tensile strength, and Young's modulus. No prior art graphene film or graphene paper even comes close to these combined properties. Again, specifically and most significantly, these chemically functionalized graphene sheets are capable of chemically bonding, linking, or merging with one another and becoming integrated into highly parallel and interconnected graphene sheets (e.g. FIG. 3(a)).

The degree of graphene sheet orientation can be measured by x-ray diffraction (XRD) using full width at half maximum (FWHM) of the X-ray scattering intensity as a function of the azimuthal angle. The degree of orientation may be calculated from the following equation: $0=100\% \times (180-FWHM)/180$. It is of interest to note that the use of comma coating for graphene dispersion deposition typically results in an integral graphene film having a degree of orientation of approximately from 87% to 93%. Slot-die coating typically leads to a degree of orientation of approximately from 90% to 96% and a reverse-roll coating leads to 93% to 99%.

Due to these compositional and structural features, the produced integral graphene film has a thermal conductivity from 200 to 1,600 W/mK, or an electrical conductivity from 600 to 15,000 S/cm; more preferably and typically having a thermal conductivity of at least 350 W/mK or an electrical conductivity no less than 1,000 S/cm; further more preferably and typically having a thermal conductivity of at least 600 W/mK or an electrical conductivity no less than 2,500 S/cm; still further preferably and typically having a thermal conductivity of at least 1,000 W/mK or an electrical conductivity no less than 5,000 S/cm; and most preferably having a thermal conductivity of at least 1,200 W/mK, or an electrical conductivity no less than 8,000 S/cm. The integral graphene film typically and preferably has a Young's modulus from 20 GPa to 250 GPa (more typically from 30 GPa to 150 GPa), or a tensile strength from 1.0 GPa to 3.5 GPa (more typically from 1.2 GPa to 3.0 GPa).

The following examples are used to illustrate some specific details about the best modes of practicing the instant invention and should not be construed as limiting the scope of the invention.

Example 1: Preparation of Single-Layer Graphene Sheets from Mesocarbon Microbeads (MCMBs)

Mesocarbon microbeads (MCMBs) were supplied from China Steel Chemical Co., Kaohsiung, Taiwan. This material has a density of about 2.24 g/cm³ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. The GO suspension was cast into thin graphene films on a glass surface and, separately, was also slot die-coated onto a PET film substrate.

Example 2: Preparation of Pristine Graphene Sheets (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene film having a higher thermal conductivity. Pristine graphene sheets were produced by using the direct ultrasonication or liquid-phase production process.

In a typical procedure, five grams of graphite flakes, ground to approximately 20 m or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

The pristine graphene sheets were immersed into a 10 mM acetone solution of BPO for 30 min and were then taken out drying naturally in air. The heat-initiated chemical reaction to functionalize graphene sheets was conducted at 80° C. in a high-pressure stainless steel container filled with pure nitrogen. Subsequently, the samples were rinsed thoroughly in acetone to remove BPO residues for subsequent Raman characterization. As the reaction time increased, the characteristic disorder-induced D band around 1330 cm$^{-1}$ emerged and gradually became the most prominent feature of the Raman spectra. The D-band is originated from the $A_{1g}$ mode breathing vibrations of six-membered sp$^2$ carbon rings, and becomes Raman active after neighboring sp$^2$ carbon atoms are converted to sp$^3$ hybridization. In addition, the double resonance 2D band around 2670 cm$^{-1}$ became significantly weakened, while the G band around 1580 cm$^{-1}$ was broadened due to the presence of a defect-induced D' shoulder peak at ~1620 cm$^{-1}$. These observations suggest that covalent C—C bonds were formed and thus a degree of structural disorder was generated by the transformation from sp$^2$ to sp$^3$ configuration due to reaction with BPO.

The functionalized graphene sheets were re-dispersed in water to produce a graphene dispersion. The dispersion was then made into graphene films using comma coating, slot-die coating, and reverse-roll coating.

Example 3: Preparation of Graphene Oxide (GO) Suspension from Natural Graphite

Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%.

By dispensing and coating the GO suspension to form graphene films on a polyethylene terephthalate (PET) substrate in a comma coater and removing the liquid medium from the coated films of dried graphene oxide. Several GO films were then immersed in a solution of 10,12-pentacosadiyn-1-ol [$CH_3(CH_2)_{11}C\text{—}C\text{—}C\text{—}C(CH_2)_8CH_2OH$], or PCO, allowing PCO to permeate into GO films and contacting therewith. As illustrated in Scheme 3, FIG. 5(C), the films, after drying, were exposed to UV light to provide films of PCO-GO sheets in which the diacetylene groups of PCO react by 1,4-addition polymerization. Subsequently, the films were immersed in hydroiodic acid (HI) to reduce the PCO-GO sheets in the film into graphene-PCO sheets. Then, the films of graphene-PCO sheets is immersed successively into 1-pyrenebutyric acid N-hydroxysuccinimide ester (PSE) and 1-aminopyrene (AP) solutions, thereby providing films of interconnected rGO sheets in which the PSE and AP have bonded through π-π interactions with neighboring rGO sheets and react to provide PSE-AP covalent bonds.

Additionally, GO sheets were chemically functionalized in a similar manner, but prior to being dispersed in a liquid medium to make a graphene dispersion. The chemically treated graphene sheets were then dispersed in water and coated to form wet film, dried, and made into integral graphene films.

Example 4: Preparation of Graphene Fluoride Sheets

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but a longer sonication time ensured better stability. Upon extrusion to form wet films on a glass surface with the solvent removed, the dispersion became brownish films formed on the glass surface.

Example 5: Preparation of Nitrogenated Graphene Sheets

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 have the nitrogen contents of 14.7, 18.2 and 17.5 wt. %, respectively, as found by elemental analysis. These nitrogenated graphene sheets, without prior chemical functionalization, remain dispersible in water. The resulting suspensions were then coated and made into wet films and then dried.

Example 6: Chemical Functionalization of Graphene Fluoride and Nitrogenated Graphene Films Dried films of graphene fluoride and nitrogenated graphene prepared earlier were subjected to functionalization by bringing these film specimens in chemical contact with chemical compounds such as carboxylic acids, azide compound (2-azidoethanol), alkyl silane, diethylenetriamine (DETA), and chemical species containing hydroxyl group, carboxyl group, amine group, and sulfonate group ($-SO_3H$) in a liquid or solution form.

Scanning electron microscopy (SEM), transmission electron microscopy (TEM) pictures of lattice imaging of the graphene filament, as well as selected-area electron diffraction (SAD), bright field (BF), and dark-field (DF) images were also conducted to characterize the structure of graphene films.

Figure 3C:
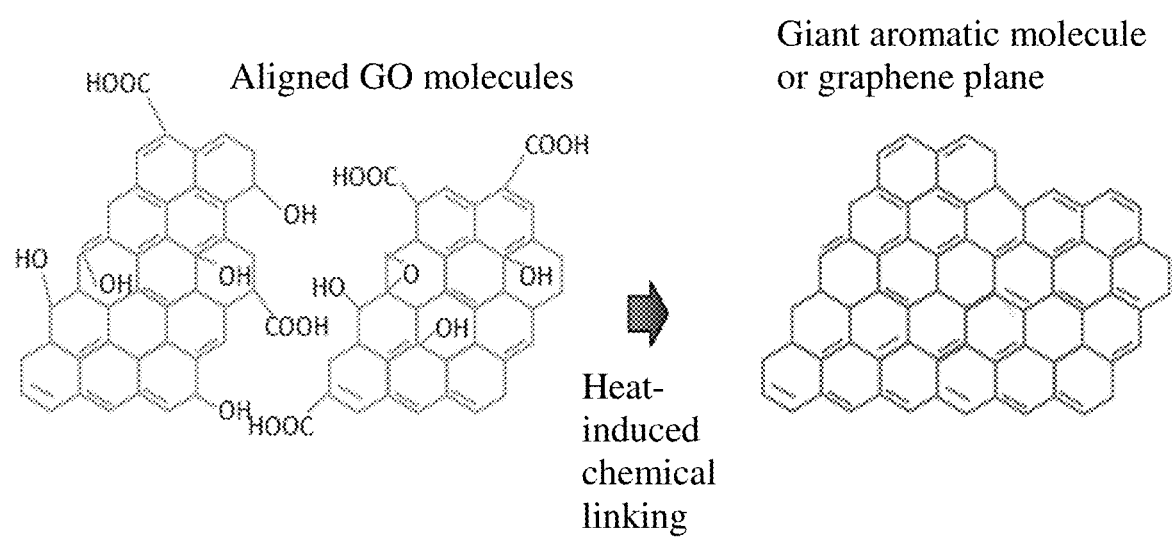
FIG. 3(c) One plausible chemical linking mechanism (only 2 GO sheets are shown as an example; a large number of GO sheets can be chemically linked together to form an integral graphene film.

A close scrutiny and comparison of FIG. 3($a$) indicates that the graphene planes in a graphene film are substantially oriented parallel to one another. The inclination angles between two identifiable layers in the graphene film are mostly less than 5 degrees. In contrast, there are so many folded graphene sheets, kinks, pores, and mis-orientations in graphene paper (e.g. FIG. 3(B)).

Example 7: Electrical and Thermal Conductivity Measurements of Various Graphene Films Four-point probe tests were conducted on chemically functionalized graphene films along film plane directions to measure their in-plane electrical conductivity. This method is well-known in the art. Their in-plane thermal conductivity was measured using a laser flash method (Netzsch Thermal Diffusivity Device). The operating manual of the instrument provides a standard procedure for this test on a thin film. Thermal films are commonly used heat spreaders in a smart phone.

Due to the unique compositional and structural features, the presently invented integral graphene films have a thermal conductivity typically from 200 to 1,600 W/mK. The electrical conductivity is typically from 600 to 15,000 S/cm. These films have a thermal conductivity more typically from 350 to 1,500 W/mK or an electrical conductivity more typically from 1,000 to 12,000 S/cm.

Figure 6:
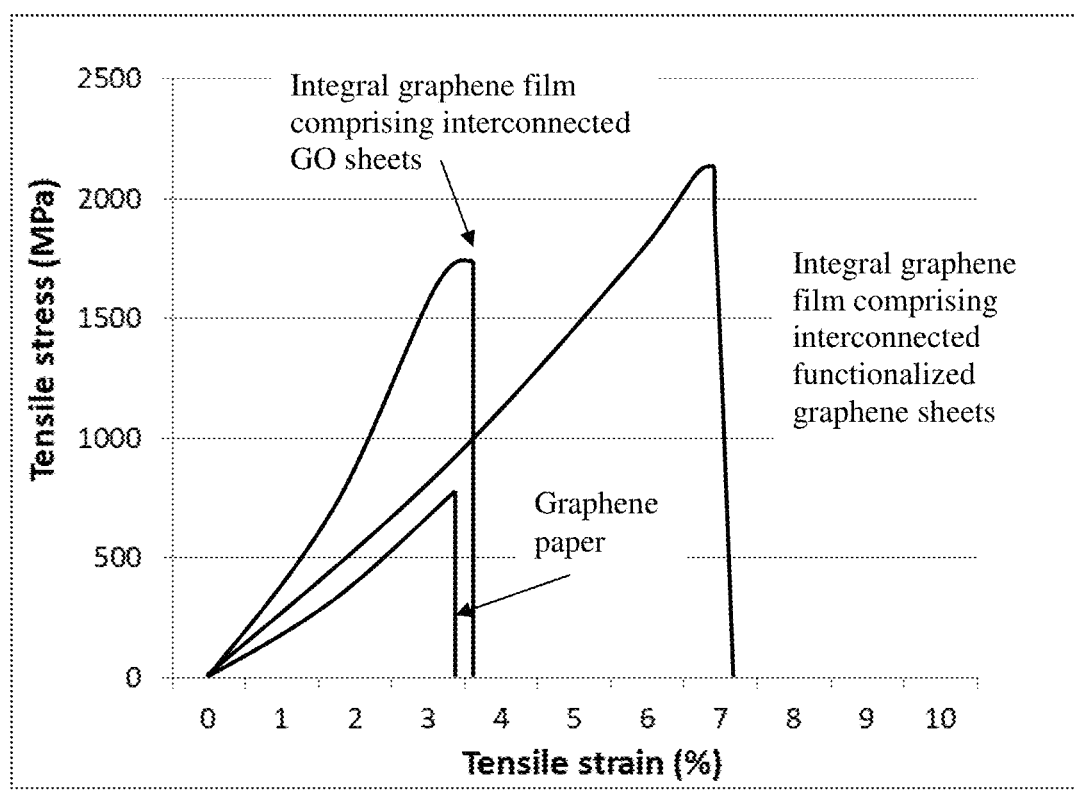
FIG. 6 Tensile strength and Young's modulus of three graphene films: one derived from highly oriented chemically functionalized graphene sheets, one derived from highly oriented graphene oxide sheets, and a conventional sheet of graphene paper.

Example 8: Tensile Strength of Various Integral Graphene Films and Graphene Paper Sheet A universal testing machine was used to determine the tensile strength and Young's modulus of various graphene films and baseline sheets of conventional graphene paper. Representative results on tensile strength and Young's modulus for two types of presently invented integral graphene films and one conventional reduced graphene oxide platelet-based paper sheet are shown in FIG. 6. This specimen of an integral graphene film produced from chemically functionalized graphene sheets exhibits a tensile strength of 2.15 GPa and a Young's modulus of 28 GPa. The graphene film produced from oriented GO sheets exhibits a tensile strength of 1.77 GPa and Young's modulus of 54 GPa. Most of the presently invented integral graphene films have a Young's modulus from 20 GPa to 250 GPa (more typically from 30 GPa to 150 GPa), or a tensile strength from 1.0 GPa to 3.5 GPa (more typically from 1.2 GPa to 2.5 GPa).

These data have demonstrated that the tensile strength and Young's modulus of the functionalized graphene-derived integral graphene films have exceeded the highest strength and highest modulus ever achieved by any graphene-based films. The presently invented integral graphene films derived from highly oriented and closely-packed functionalized graphene sheets are a new class of material by itself.

We claim:

1. A process for producing an integral graphene film from chemically functionalized graphene sheets, said process comprising:
   (a) preparing a graphene dispersion having chemically functionalized graphene sheets dispersed in a liquid medium wherein said chemically functionalized graphene sheets comprise chemical functional groups attached thereto and a non-carbon element content of 0.1% to 47% by weight;
   (b) dispensing and depositing a wet film of said graphene dispersion onto a supporting substrate via high-rate or high-intensity spraying, or extrusion plus high-rate wiping, wherein said dispensing and depositing procedure includes mechanical shear stress-induced alignment of said chemically functionalized graphene sheets along a film planar direction, and partially or completely removing said liquid medium from said wet film to form a dried graphene film comprising aligned chemically functionalized graphene sheets; and
   (c) using high-energy radiation to induce chemical reactions or chemical bonding between chemical functional groups attached to adjacent chemically functionalized graphene sheets in said dried graphene film to form said integral graphene film, wherein said integral graphene film comprises chemically functionalized graphene sheets that are chemically bonded or interconnected with one another having an inter-planar spacing $d_{002}$ from 0.36 nm to 1.5 nm as determined by X-ray diffraction and a non-carbon element content of 0.1% to 47% by weight, wherein said functionalized graphene sheets are substantially parallel to one another and parallel to a planar direction of said integral graphene film and said integral graphene film has a length from 1 cm to 10,000 m, a width from 1 cm to 5 m, a thickness from 2 nm to 500 µm, and a physical density from 1.5 to 2.2 g/cm$^3$, wherein said integral graphene film has a degree of graphene plane orientation from 87% to 99%, wherein said chemically functionalized graphene sheets contain a chemical functional group selected from the group consisting of alkyl or aryl silane, alkyl or aralkyl group, hydroxyl group, carboxyl group, carboxylic group, amine group, sulfonate group, aldehydic group, quinoidal, fluorocarbon, derivatives thereof, and combinations thereof; wherein said chemically functionalized graphene sheets contain a chemical functional group selected from an oxygenated group consisting of hydroxyl, peroxide, ether, keto, aldehyde, and combinations thereof; or wherein said chemically functionalized graphene sheets contain a chemical functional group selected from the group consisting of 10,12-pentacosadiyn-1-ol, hydroiodic acid, 1-pyrenebutyric acid N-hydroxysuccinimide ester, 1-aminopyrene, derivatives thereof, and combinations thereof.

2. The process of claim 1, wherein said inter-plane spacing $d_{002}$ is from 0.4 nm to 1.2 nm, the non-carbon element content is from 1% to 20%, or physical density from 2.0 to 2.15 g/cm$^3$.

3. The process of claim 1, wherein said integral graphene film has a thermal conductivity from 200 to 1,600 W/mK or an electrical conductivity from 600 to 15,000 S/cm.

4. The process of claim 1, wherein said integral graphene film has a Young's modulus from 20 GPa to 200 GPa, or a tensile strength from 1.0 GPa to 3.5 GPa.

5. The process of claim 1, further comprising a step of compressing said integral graphene film to increase a degree of graphene sheet orientation and physical density, and to improve contact between chemically functionalized graphene sheets.

6. The process of claim 1, further comprising a step of reducing said non-carbon content to less than 20% by weight using chemical, thermal, UV, or radiation means.

7. A process for producing an integral graphene film from graphene sheets, said process comprising:
   (a) preparing a graphene dispersion having un-functionalized graphene sheets dispersed in a liquid medium;
   (b) dispensing and depositing a wet film of said graphene dispersion onto a supporting substrate via high-rate or high-intensity spraying, or extrusion plus high-rate wiping, wherein said dispensing and depositing procedure includes mechanical shear stress-induced alignment of said un-functionalized graphene sheets along a film planar direction, and partially or completely removing said liquid medium from said film to form a dried graphene film comprising aligned graphene sheets;
   (c) bringing said dried graphene film in contact with a chemical functionalizing agent so as to produce a film of chemically functionalized graphene sheets having chemical functional groups attached thereto and a non-carbon element content of 0.1% to 47% by weight; and
   (d) using high-energy radiation to induce chemical reactions or chemical bonding between chemical functional groups attached to adjacent chemically functionalized graphene sheets to form said integral graphene film, wherein said integral graphene film comprises chemically functionalized graphene sheets that are chemically bonded or interconnected with one another having an inter-planar spacing $d_{002}$ from 0.36 nm to 1.5 nm as determined by X-ray diffraction and a non-carbon element content of 0.1% to 47% by weight, wherein said functionalized graphene sheets are substantially parallel to one another and parallel to a planar direction of said integral graphene film and said integral graphene film has a length from 1 cm to 10,000 m, a width from 1 cm to 5 m, a thickness from 10 nm to 500 µm, and a physical density from 1.5 to 2.2 g/cm$^3$, wherein said integral graphene film has a degree of graphene plane orientation from 87% to 99%, wherein said chemically functionalized graphene sheets contain a chemical functional group selected from the group consisting of alkyl or aryl silane, alkyl or aralkyl group, hydroxyl group, carboxyl group, carboxylic group, amine group, sulfonate group, aldehydic group, quinoidal, fluorocarbon, derivatives thereof, and combinations thereof; wherein said chemically functionalized graphene sheets contain a chemical functional group selected from an oxygenated group consisting of hydroxyl, peroxide, ether, keto, aldehyde, and combinations thereof; or wherein said chemically functionalized graphene sheets contain a chemical functional group selected from the group consisting of 10,12-pentacosadiyn-1-ol, hydroiodic acid, 1-pyrenebutyric acid N-hydroxysuccinimide ester, 1-aminopyrene, derivatives thereof, and combinations thereof.

8. The process of claim 7, wherein said chemically functionalized graphene sheets further contain a chemical functional group selected from a derivative of an azide compound selected from the group consisting of 2-azidoethanol, 3-azidopropan-1-amine, 4-(2-azidoethoxy)-4- oxobutanoic acid, 2-azidoethyl-2-bromo-2-methylpropanoate, chlorocarbonate, azidocarbonate, dichlorocarbene, carbene, aryne, nitrene, (R—)-oxycarbonyl nitrenes, where R=any one of the following groups,

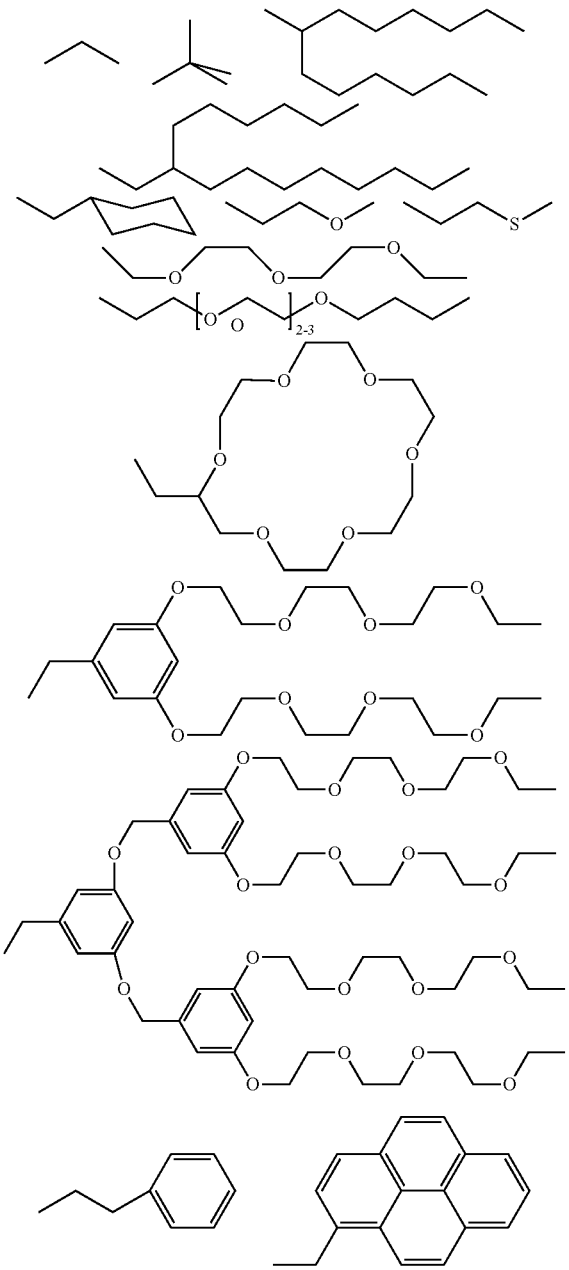

and combinations thereof.

9. The process of claim 7, wherein said chemically functionalized graphene sheets further contain a chemical functional group selected from the group consisting of —$SO_3H$, —COOH, —$NH_2$, —OH, —R'CHOH, —CHO, —CN, —COCl, halide, —COSH, —SH, —COOR', —SR', —$SiR'_3$, —Si(—OR'—$)_yR'_3$—y, —Si(—O—$SiR'_2$—)OR', —R'', Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and Z is carboxylate or trifluoroacetate, derivatives thereof, and combinations thereof.

10. The process of claim 7, wherein said chemically functionalized graphene sheets further contain a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, derivatives thereof, and combinations thereof.

11. The process claim 7, wherein said chemically functionalized graphene sheets further contain a chemical functional group selected from OY, NHY, O=C—OY, P=C—NR'Y, O=C—SY, O=C—Y, —CR'1—OY, N'Y or C'Y, a derivative thereof, or a combination thereof, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, R'$N^+$($R')_3X''$, $R'SiR'_3$, R'Si(—OR'—$)_yR'_{3-y}$, R'Si(—O—$SiR'_2$—)OR', R'—R'', R'—N—CO, ($C_2H_4O$—$)_wH$, (—$C_3H_6O$—$)_wH$, (—$C_2H_4O)_w$—R', ($C_3H_6O)_w$—R', R', and w is an integer greater than one and less than 200.

12. The process of claim 7, wherein said integral graphene film has a thermal conductivity from 350 to 1,600 W/mK or an electrical conductivity from 1,000 to 15,000 S/cm.

13. The process of claim 7, wherein said integral graphene film has a Young's modulus from 20 GPa to 130 GPa or a tensile strength from 1.0 GPa to 3.0 GPa.

14. The process of claim 7, further comprising a step of compressing said integral graphene film to increase a degree of graphene sheet orientation and physical density, and to improve contact between chemically functionalized graphene sheets.

15. The process of claim 7, further comprising a step of reducing said non-carbon content to less than 20% by weight using chemical, thermal, UV, or radiation means.

* * * * *